United States Patent [19]

Soane

[11] Patent Number: 5,243,680
[45] Date of Patent: Sep. 7, 1993

[54] PACKAGE FOR OPTICAL FIBER COUPLERS

[75] Inventor: David S. Soane, Piedmont, Calif.

[73] Assignee: Soane Technologies, Inc., Hayward, Calif.

[21] Appl. No.: 891,706

[22] Filed: Jun. 1, 1992

[51] Int. Cl.[5] .................................... G02B 6/26
[52] U.S. Cl. ............................. 385/137; 385/41; 385/42
[58] Field of Search ............... 385/137, 99, 88, 96, 385/41, 42; 427/163

[56] References Cited

U.S. PATENT DOCUMENTS

| | | | |
|---|---|---|---|
| 4,801,185 | 1/1989 | Bricheno | 385/42 |
| 4,906,068 | 3/1990 | Olson et al. | 385/43 |
| 5,019,301 | 5/1991 | Coden et al. | 385/46 |
| 5,061,336 | 10/1991 | Soane | 156/245 |

Primary Examiner—John D. Lee
Assistant Examiner—Phan T. Heartney
Attorney, Agent, or Firm—Kilpatrick & Cody

[57] ABSTRACT

A package configuration for the protection/packaging/encapsulation of optical fiber couplers is described. The packaging strategy exploits symmetry in geometrical design while using material with similar thermal expansion properties to minimize thermoelastic stresses in the final assembled parts. When glass fibers are fused together or spliced in a planar waveguides, a complementary, symmetrically shaped glass piece linked to the coupler device by a chemically-tethered and cross-linked polymeric matrix, provides a stress-free as-assembled package that further maintains minimal thermoelastic stresses during temperature cycling. The packaged assembly is thus exceptionally rugged, experiencing little loss and fluctuation of coupling characteristics in installation and use.

21 Claims, 2 Drawing Sheets

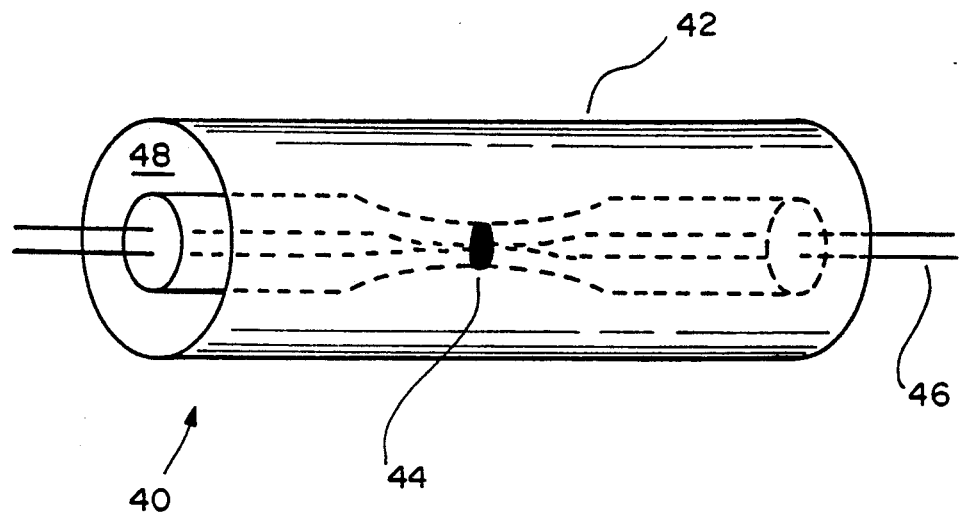
FIG. 4
FIG. 5
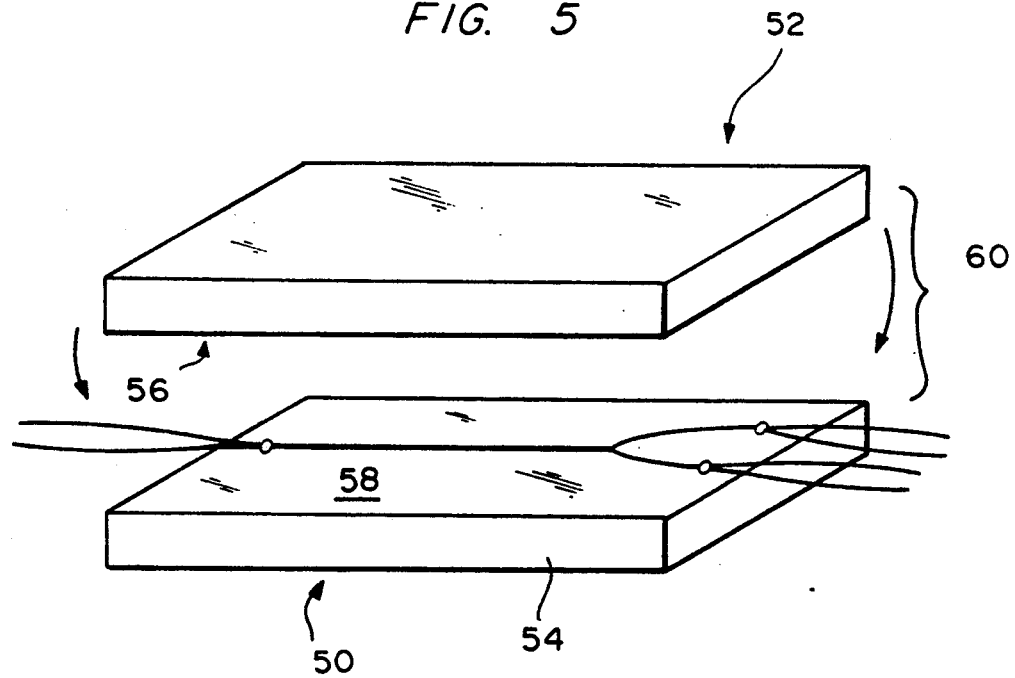

PACKAGE FOR OPTICAL FIBER COUPLERS

BACKGROUND OF THE INVENTION

The present invention is in the general field of packaging of fiber optics, and is in particular a package that maintains precise alignment and spatial placements of the optical fibers.

Fiber optics is a rapidly evolving field. The basic optical fiber concept capitalizes on the intrinsic low loss and high speed data transmission of the fiber. The use of fiber optics has created a whole burgeoning industry. Optical fibers are used in various telecommunication and network applications, as reviewed by C. Yeh, "Handbook of Fiber Optics; Theory and Applications", (Academic Press, San Diego, Calif., 1990), and H. Murata, "Handbook of Optical Fibers and Cables" (Marcek Dekker, New York, 1988). In the foreseeable future, the field is expected to experience a quantum leap in stature and product diversification. Anchoring such development is the recent advances in fiber coupling technologies.

The very fact optical fibers are low loss media implies difficulties in coupling and distributing signals among multiple fibers. To date, fiber coupling can be achieved by several means. The major classes are fused biconic taper and planar waveguides, as described by K. Murphy, Lasers and Optronics, 10:5, 63 (1991). Also significant are beam splitter taps employing angled mirrors, half mirrors or spherical mirrors (or lenses).

When two dissimilar materials are joined together and subjected to heat or cool cycles, the differences in their thermal expansion coefficients can induce large stresses. Depending on the exact geometry and material distribution, the transient stress field may be quite complex. Stress concentration points may easily damage fragile microstructures. Even in a simple layout such as two thin fibers adhering to each other, temperature cycling may cause the bi-material strip to curl and flex, accelerating fatigue of the system.

Since the traditional packaging approach is to employ a plastic-based encapsulant (e.g., epoxy) to wrap the bare device, transient stresses pose a significant device reliability problem. The plastic encapsulant is sometimes filled with solid particles in order to approximate the thermal expansion properties of the substrate (device). However, an exact match is not possible, especially over a wide service temperature range. The traditional encapsulants also arguably do not form strong chemical bonds with the substrate, permitting potential delamination at material interfaces during stress cycling. Moisture and/or chemical ingression along delaminated interfaces further deteriorates coupler performance. When the encapsulants are unevenly distributed over the packaged devices, stress concentration point, shear, compression, tension, and torque movements can all be expected in a complex coupler.

In addition to transient stresses accompanying temperature cycling, stress often exists in as-packaged devices without temperature cycling. This phenomenon is due to the shrinkage associated with polymerization (curing) of encapsulants. Since the packaging material and the substrate are both in the glassy states under normal use conditions, shrinkage of a polymeric material as it is formed around a device may engender appreciable stress.

It is therefore an object of the present invention to provide an improved method for making optical fiber couplers.

It is a further object of the present invention to provide packaged optical fiber couplers having decreased shrinkage.

It is also an object of the present invention to provide an improved method for making, and packaging, for fiberoptics transceivers.

SUMMARY OF THE INVENTION

A combination processing/material approach has been designed to overcome the prior art problems with thermal expansion within optical fiber couplers. The process uses the geometric symmetry of the coupler and stiffener, exactly matched thermal expansivity of the stiffener and substrate, tethered crosslinked polymer intervening layers to affix the pigtail/component positions, sequential polymerization to minimize stress of the polymer network during packaging, and a final overcoat with an elastomeric outer layer to withstand mechanical handling during installation. The judicious use of a plurality of materials at the exact places by the prescribed, controlled formation manner ensure overall packaging success and reliability.

BRIEF DESCRIPTION OF THE DRAWINGS

FIG. 4 is a prospective view of a cylindrical stiffener for a biconic tapered coupler within a plastic-filled cavity.

FIG. 5 is a prospective view of a second substrate used to support a pigtailed planar waveguide coupler.

DETAILED DESCRIPTION OF THE INVENTION

The present invention is a method for packaging, and a package exemplified by reference to fused biconic tapers and planar waveguides. However, the basic principles of the packaging can be applied to other couplings, including splitter-type arrangements, having the same fundamental requirement of precise alignment and spatial placements of the various fibers/mirrors/lenses/substrates. Since optical fiber couplers and transmitters/receivers (transceivers) share many common packaging considerations, this process is therefore equally applicable in the area of packaging of transmitters and receivers, especially with regard to the precise alignment and spacing of the fiber or light-emitting diode during encapsulation. The precise geometry must be ensured by the encapsulating (packaging) media, while the packaging operation must induce minimal stress. After packaging, the finished assembly must maintain its extremely low stress state even during temperature cycling.

Stress management is of paramount importance, since stress is known to displace and/or distort delicate instrumentation and alter their spatial relations, as described by D. S. Soane, Chem. Eng. Progress, 86, 28 (1990). Even microscopic defects can cause unacceptable loss and coupling inefficiencies. In addition, stress exacerbates package instability under environmental degradation conditions. Moisture ingression and chemical permeation rates have been shown to increase with stress, as reported by D. S. Soane, J. Appl. Polym. Sci., 38, 859 (1989), accelerating aging of parts.

The essential elements of the packaging process are the use of one or more stiffening elements, zero-shrinkage, in situ polymerization, low-stress tethering of polymer encapsulating the coupler, and the use of an elastic polymeric material separating the stiffening element from additional stiffening elements.

The essential elements of the package are the use of one or more stiffening elements, depending on the type of coupler, a low stress tethered polymeric material encapsulating the coupler, and, in some embodiments utilizing a second stiffening element, an elastic polymeric material.

In the preferred embodiment, the inner and outer stiffening elements are formed from a material such as fused silica, glass or quartz, selected to match the properties of the optical fibers or the substrate, when used to encapsulate a transceiver; the tethering agent for the polymer is MAPTMS; the crosslinked polymer in the inner cavity is a bifunctional or multifunctional polymer formed from 20% or less diethyleneglycoldialkylcarbonate, 30% methylmethacrylate (MMA), 10% methacrylate (MA), and approximately 40% tripropyleneglycoldiacrylate, and the polymer in the outer cavity is a siloxane.

Figure 1:
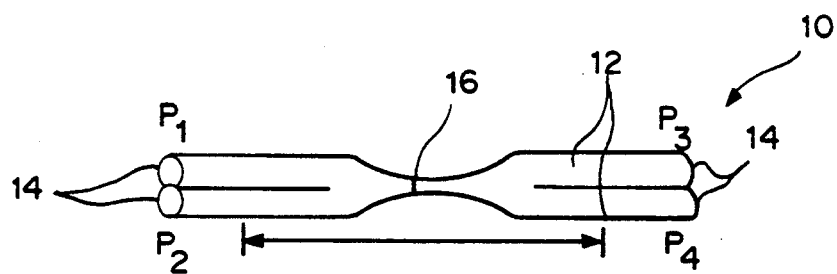
FIG. 1 is a prospective view of a prior art biconical tapered coupler, After J. F. Dalgleish, 1980 IEEE.
Figure 2:
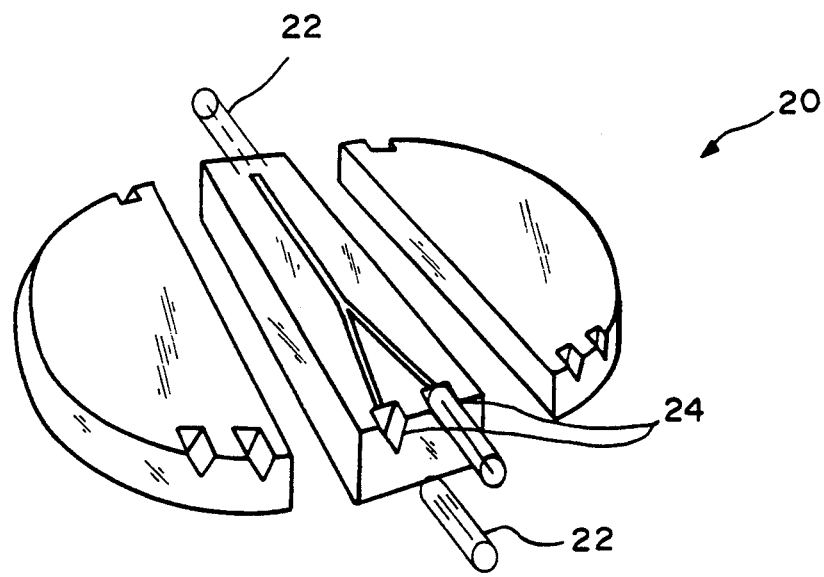
FIG. 2 is a prospective view of a prior art planar wavequide, with buried waveguides etched into an optical glass substrate.
Figure 3:
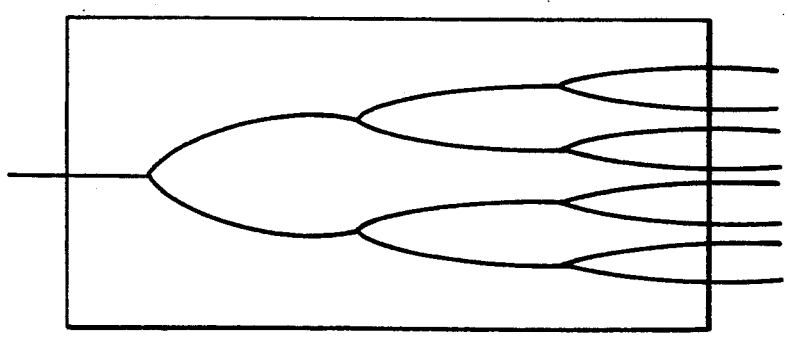
FIG. 3 is a schematic of the prior art use of planar technologies to allow passive integration of Y-junctions on a single component to form a $1 \times N$ coupler.

Schematic diagrams of a fused biconic taper 10 and a planar waveguide 20 are shown in FIGS. 1 and 2. The fused biconic structure 10 is formed by first putting optical fibers 12 (two or more) in a juxtaposed position (paralleling and adjacent to each other). The ends 14 are stretched in opposite directions while the middle portion 16 is fused together. The simultaneous stretching and heating action induces the necessary taper and the fusion of fibers. Evanescent wave cross-over accounts for the power coupling, with elaborate shape and index of refraction engineering underpinning coupler performance.

A hollow glass cylinder is often used in the biconic taper, through which the fibers are threaded, to facilitate fusion and taper forming. The middle section of the cylinder is heated while the ends are stretched. This allows the middle section to fuse together with the fibers to yield an integral, finished part. As referred to herein, this cylinder may constitute the "inner stiffening element" or it may be considered with the fiber coupler, in terms of being placed within an additional cylinder(s).

In the case of planar waveguides, selected regions are doped on a flat glass substrate, forming the requisite refractive index profiles for waveguiding. The overall geometrical layout may adopt the configuration of a Y-shaped pattern as shown in FIG. 2. A multitude of Y-shaped patterns can also be used to effect a 1×N interconnection. When the planar waveguides serve as the coupling media, the fibers 22 are butted against the ends 24 of the embedded pattern, leaving pigtail fibers 26 emanating from the coupler structure. The relative position of the fibers with respect to the waveguide must be kept precisely in a three dimensional sense. The fiber end must match the pattern end and the gap between the two minimized. This stringent spatial requirement dictates absolute alignment accuracy and stress minimization.

The Packaging

The primary features of the combined processing and material solution described herein to enhance the reliability of coupler packaging are as follows:

1. The substrate is chemically bonded to a plastic protective layer or encapsulant. In the case of fused biconic tapers, the substrate are the fibers and necked-down cylinder. In the case of the planar waveguide, the substrate is a chip diced from doped flat glass or silicon.

2. The substrate is stiffened by a complementary piece with a matched expansion coefficient. In the case of a fused biconic taper, an additional cylinder is slid over the necked-down cylinder and the fused pigtail fibers. In the case of a planar waveguide, an identically shaped dummy (without pattern) glass chip is aligned over the real substrate.

The principle features of the stiffening element are the overall package symmetry and the exactly matched expansivity of the stiffener and the substrate. Both criteria ensure the elimination of transient stresses, torques, gross shear, compression, and tension on the fine microstructures the packaging operation is designed to protect.

3. Both stiffening elements are linked to the respective substrates by way of a layer of polymer network firmly anchored (tethered) to both the stiffener and the substrate. For the biconic coupler, the polymer fills the approximately annular spaces between the stiffener (the outer cylinder) and the inner cylinder and between the cylinder and the fused fibers. For the planar coupler, the polymer occupies the parallel gap between the substrate and the dummy plate. In some cases the properties of the polymer are different between the outer and inner cylinder and between the inner cylinder and between the fused fibers.

4. The polymer layer is sequentially polymerized in order for the space vacated by the shrinking reactant (partially polymerized monomer/crosslinker precursor liquid) to be continuously filled by the still-fluid reactant drawn in from the unactivated zone or a reservoir mounted at the periphery of the gap, to yield a final product that does not contain any voids or areas of high stresses as a result of shrinkage during polymerization. The preferred method of sequential polymerization is described in U.S. Pat. No. 5,061,336 to Soane, the teachings of which are incorporated herein.

5. The polymer layer is preferably crosslinked to ensure mechanical stability. It may be selected based largely on considerations of optical and mechanical properties.

6. After a given device is protected by linkage of the substrates to the stiffening element via the tethered polymer network, the whole assembly may be encapsulated once over by a soft, shock-absorbing elastomer externally to greatly increase its mechanical handling characteristics without sacrificing any of the existing attributes of the internal couplers.

The inner stiffening element

The inner stiffening element is preferably formed of glass or other appropriate material that is comparable or equivalent to the coefficient of thermal expansion of the substrate, is mechanically rigid, and thermally and chemically stable. In general, the material will be fused silica, glass, or quartz.

The stabilizing polymer between the substrate and the stiffening element

A variety of polymerizable and crosslinkable materials can be used. The monomers or prepolymers (collectively referred to herein as "monomers") are preferably in liquid form and are flowed into the cavity between the stiffening element and the substrate. The full cavity is then sequentially polymerized using radiation or light, such as light from a laser, beginning at one end of the cavity and moving toward the other at a rate consistent with the rate of polymerization. Simultaneously with polymerization, unreacted monomer is flowed into the cavity around the polymerized material to ensure that there are no voids as a result of shrinkage during polymerization.

The preferred crosslinked polymers are bifunctional or multifunctional polymers such as a mixture of 15 to 17.5% diethyleneglycoldialkylcarbonate, 30% methylmethacrylate, 10% methacrylic acid, and approximately 40% tripropylene glycol disacrylate, which are impact and abrasion resistant.

The formulation may include a toughening agent, such as the multi-functional crosslinkers described in U.S. Ser. No. 07/820,271 filed Jan. 14, 1992 by David S. Soane, to increase the shatter and fatigue resistance. The polymer may be filled with solid filler particles or unfilled. It may be chosen from a variety of materials, including vinyls, styrenics, acrylates, methacrylates, polyesters, polyamides, polyimides, and epoxies, and may be a homopolymer or a copolymer. It may be purposely hydrophobic with a fine-tuned nonpolar/polar mix. The polar/nonpolar will be decided by the environment in which the packaged coupler is used. The greater the polarity, the greater the adhesion. However, for applications where there is high humidity or exposure the water, a nonpolar package may be used to limit leakage. It may have antioxidants and pigments dispersed within, without endangering performance.

In some embodiments, an initiator is included in the mixture which breaks the double bonds of the monomer, a process that characterizes those monomers that can be polymerized by means of free-radical initiation. In this embodiment, the free-radical initiation is caused by a photo-decomposition initiator.

Crosslinking agents for hard monomers that are polymerized by a chain process include tri-, tetrafunctional acrylates or methacrylates, alkylene glycol and polyalkylene glycol diacrylates and methacrylates, including ethylene glycol dimethacrylate and ethylene glycol diacrylate, vinyl or allyl acrylates or methacrylates, tripropylene glycol diacrylate or dimethacrylate, divinylbenzene, diallyldiglycol dicarbonate, diallyl maleate, diallyl fumarate, diallyl itaconate, vinyl esters such as divinyl oxalate, divinyl malonate, the dimethacrylates or diacrylates of bis-phenol A or ethoxylated bis-phenol A, methylene or polymethylene bisacrylamide, divinyl sulfone, and others.

The amount of crosslinking agent added will determine how tightly crosslinked the final network is. The crosslinking agent is typically added in an amount ranging from 0.1% to 80% by weight.

Both thermal and ultraviolet initiators are well-known to those skilled in the art. See, for example, N. S. Allen, Photopolymerization and PhotoImaging Science and Technology, Elsevier Publishers, 1989)

Tethering Agents

The macromolecular network prepared by crosslinking of the polymer between the stiffening element and the substrate is preferably tethered to the substrate and stiffening element by coating the materials with a tethering agent prior to polymerization of the polymer. Small difunctional or multifunctional reactive molecule, or mixtures of small di- or multifunctional molecules, are used. The use of a wall coupling agent has been found to significantly enhance the stability of the polymerized layer, since the polymer is then held firmly in place by the wall.

A preferred tethering agent for photo-polymerizable or thermally polymerizable unsaturated monomers is straight (pure) or diluted 3-methacryloxy-propyl-trimethoxysilane (MAPTMS) (in acetone solution) used to coat the substrate and the stiffening element. The substrate and stiffening agent is then air dried and heated in an oven for three hours at about 130 degrees Centigrade to effect MAPTMS binding to the substrate wall surfaces. The MAPTMS promotes strong wall adhesion and a dense, highly cross-linked layer adjacent to the wall. Although not as simple, other wall coupling agents and procedures may also be used. For example, another approach is to covalently bond aminopropyltrimethoxysilane or aminopropyltriethoxysilane to the substrate. N-acryloxysuccimide is then used to cause substitution addition. This is then followed by treatment with diethylacrylamide to cause crosslinking of the materials on the wall. In all of the procedures above, the goal is to leave a wall surface covered with double bonds directly linked to the wall by chemical bonds. These double bonds can then react with the reactive monomers and crosslinkers in the differential polymerization process.

The elastic polymer between the inner Stiffening Element and the Outer Stiffening Element The polymer between the inner and the outer stiffening element should preferably be elastic, although it may be rigid. Examples of suitable polymers include vinyl substituted siloxanes, allyl substituted siloxanes, acrylate terminated or substituted siloxanes, and partially or perfluorinated derivatives of vinyl substituted siloxanes, allyl substituted siloxanes, or acrylate terminated or substituted siloxanes, which can copolymerize with a variety of monomers through well-established free radical chemistry. Alternatively, more simple polymers can be used such as polymethylmethacrylate and polyakylacrylates.

In the preferred embodiment, a mixture of 10% diethyleneglycoldialkylcarbonate, 10% methylmethacrylate, 30% methacrylic acid, and approximately 50% tripropylene glycol disacrylate is used. This can be flowed with approximately 25% polybutyldiene or dipropyleneglycoldiacrylatetripropyleneglycol to soften the polymer.

The outer stiffening element

The general criteria with regards to selection of the material for the outer stiffening element are as follows. The materials should have matched geometry (symmetry) and matched coefficients of thermal expansion with the fibers or transceiver substrate, the materials should be rigid but not too brittle, the materials should be chemically and thermally stable, and the surface should preferably be suited for treatment with a tethering agent.

Although it is not an essential requirement that the material be a certain color or have a certain refractive index, it must be transparent to the medium used to polymerize the polymer, such as ionizing radiation.

The resulting packaging is shown in FIGS. 4 and 5, as described below in the following non-limiting examples.

Example 1: Construction of a stable fused biconic tapered coupler

As shown in FIG. 4, a fused biconic tapered coupler 40 is placed within a cylindrical stiffening element 42. The fused fiber pigtails 46 project from the coupler 44 out through the end of the cylindrical stiffening element 42. The space 48 between the stiffening element 42 and the biconic fused tapered coupler 40 is filled with a polymer to stabilize and protect the coupler.

The package is constructed as follows. The fused biconic tapered coupler 40 is placed within a cylinder 42 and carefully positioned to be sure the coupler efficiency is optimal. The cavity 48 is filled with a monomer or prepolymer solution. The monomer solution is sequentially polymerized in either of two ways: the polymerizing light is moved from the center fused section of the coupler out towards to the fiber ends, polymerizing both cavities at the same time, or one side of the cavity is filled and polymerized, then the other side of the cavity is filled and polymerized. This process is repeated to refill the areas where polymer shrinkage leaves a void, until the cavity is completely filled with polymer.

Some couplers will be manufactured with the fused glass cylinder forming a part of the coupler, in which case the first step of the process (placement of the cylinder) is omitted, but the remaining steps are the same.

Although not essential, in the preferred embodiment the packaged coupler is placed within a second cylinder and the cavity between the second cylinder and the coupler is filled with polymer.

Example 2: Construction of a stable Planar Waveguide

A pigtailed planar waveguide 50 stabilized as described above is shown in FIG. 5. The waveguide was constructed as follows.

1. A dummy chip 52 was cut to match dimensions of the planar waveguide substrate 54.

2. The underside 56 of the dummy chip 52 and the surface 58 of the device substrate (with the fiber pigtails) 54 was treated with a coupling agent (MAPTMS).

3. The dummy chip 52 and the device substrate 54 were placed in close proximity with a parallel gap 60 in between.

4. The gap 60 was then filled with a partially prepolymerized reactant (93% MMA, 5% polyvinylmethylsiloxane (PVMS), 1% crosslinker ethyleneglycoldimethacrylate (EGDMA), and 1% photoinitiator).

5. The reaction mixture was then sequentially polymerized in the gap from one end to the opposite end, by means of a moving slit of UV light (or laser) scanning over the reactant through the transparent glass dummy chip 52. At all times during the polymerization, additional reactant was introduced into the gap from the end to be polymerized last.

6. The finished stabilized coupler 50 was then overcoated with a soft elastomer, such as silicone rubber, neoprene, polybutadiene, styrene-butadiene rubber (SBR), or other soft commercial junction coating materials.

The entire assembly becomes exceptionally sturdy, stress free, and resistant to damage due to handling. The pigtails extending from the packaged couplers may be used for interconnection to telecommunication or computer networks.

Modifications and variations of the present invention will be obvious to those skilled in the art. Such modifications and variations are intended to come within the scope of the appended claims.

I claim:

1. A packaging for an optical fiber coupler comprising:
    a first stiffening element having geometric symmetry with the coupler;
    wherein the materials forming the stiffener and coupler have equivalent thermal expansivity; and
    crosslinked polymer filling the annular space between the coupler and the stiffening element,
    wherein the polymer is tethered to the stiffening element and is sequentially polymerized to minimize stress of the polymer network.

2. The packaging of claim 1 wherein the coupler is a planar waveguide.

3. The packaging of claim 1 wherein the coupler is a fused biconic taper.

4. The packaging of claim 3 further comprising
    a second outer stiffening element, and
    a layer of an elastomeric polymer filling the space between the first inner stiffening element and the outer stiffening element.

5. The packaging of claim 4 wherein the elastomeric polymer is selected from the group consisting of silicone rubber, neoprene, polybutadiene, and styrene-butadiene rubber.

6. The packaging of claim 4 wherein the first stiffening element is a cylindrical tube.

7. The packaging of claim 3 wherein the first stiffening element is a chip complementary to the substrate chip forming the coupler.

8. The packaging of claim 1 wherein the coupler is a transceiver.

9. The packaging of claim 1 wherein the crosslinked polymer is selected from the group consisting of vinyl, styrenic, acrylate, methacrylate, polyester, polyamide, polyimide, and epoxy polymers.

10. The packaging of claim 1 wherein the tethering agent is selected from the group consisting of silylating coupling agents.

11. A method for increasing the stability of an optical fiber coupler comprising:
    placing into juxtaposition with the coupler a first stiffening element having geometric symmetry with the coupler;
    wherein the materials forming the stiffener and the coupler have equivalent thermal expansivity;
    coating the substrate and the stiffening element with a tethering agent for a polymer; and
    filling the area between the substrate and the stiffening element with a monomer solution,
    sequentially polymerizing the monomer solution to form a polymer completely filing the space between the coupler and the stiffening element,
    adding monomer solution as the monomer polymerizes to fill in the spaces created by shrinkage of the polymerizing monomer solution, wherein the polymer is tethered to the stiffening element and substrate as it is polymerized.

12. The method of claim 11 wherein the coupler is a planar waveguide.

13. The method of claim 11 wherein the coupler is a fused biconic taper.

14. The method of claim 13 further comprising
providing a second outer stiffening element, and
a layer of an elastomeric polymer filling the space between the first stiffening element and the second outer stiffening element.

15. The method of claim 14 wherein the elastomeric polymer is selected from the group consisting of silicone rubber, neoprene, polybutadiene, and styrene-butadiene rubber.

16. The method of claim 14 wherein the inner stiffening element is a cylindrical tube placed over the coupler and the space between the tube and the coupler substrate is filled with polymer.

17. The method of claim 14 wherein the first stiffening element is an integral part of the fused biconic tapered coupler.

18. The method of claim 12 wherein the first stiffening element is a chip complementary to the substrate chip forming the coupler, further comprising placing the stiffening chip in close abutment with the substrate chip before filling the area between the chips with monomer solution and polymerizing the monomer.

19. The method of claim 11 wherein the crosslinked polymer is selected from the group consisting of vinyl, styrenic, acrylate, methacrylate, polyester, polyamide, polyimide, and epoxy polymers.

20. The method of claim 11 wherein the tethering agent is selected from the group consisting of silylating coupling agents.

21. The method of claim 11 wherein the coupler is a transceiver.

* * * * *